United States Patent
Chun et al.

(10) Patent No.: US 8,203,988 B2
(45) Date of Patent: Jun. 19, 2012

(54) EFFECTIVE RECEPTION METHOD IN WIRELESS COMMUNICATION SYSTEM PROVIDING MBMS SERVICE

(75) Inventors: Sung-Duck Chun, Anyang (KR);
Seung-June Yi, Anyang (KR);
Sung-Jun Park, Anyang (KR);
Young-Dae Lee, Anyang (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 12/452,793

(22) PCT Filed: Aug. 8, 2008

(86) PCT No.: PCT/KR2008/004640
§ 371 (c)(1),
(2), (4) Date: Jan. 22, 2010

(87) PCT Pub. No.: WO2009/022825
PCT Pub. Date: Feb. 19, 2009

(65) Prior Publication Data
US 2010/0128647 A1    May 27, 2010

Related U.S. Application Data

(60) Provisional application No. 60/955,040, filed on Aug. 10, 2007.

(30) Foreign Application Priority Data

Aug. 7, 2008 (KR) .................. 10-2008-0077562

(51) Int. Cl.
*H04H 20/71* (2008.01)

(52) U.S. Cl. ...................................... 370/312
(58) Field of Classification Search ............ 370/312
See application file for complete search history.

(56) References Cited

U.S. PATENT DOCUMENTS

| | | |
|---|---|---|
| 6,445,917 B1 | 9/2002 | Bark et al. |
| 6,594,240 B1 | 7/2003 | Chuah et al. |
| 6,728,918 B1 | 4/2004 | Ikeda |
| 6,862,450 B2 | 3/2005 | Mikola et al. |
| 6,874,113 B2 | 3/2005 | Chao et al. |
| 7,171,163 B2 | 1/2007 | Terry et al. |
| 7,180,885 B2 | 2/2007 | Terry |
| 7,227,868 B2 | 6/2007 | Inden |

(Continued)

FOREIGN PATENT DOCUMENTS

CN          1613210 A        5/2005

(Continued)

OTHER PUBLICATIONS

LG Electronics Inc: "UE state transition in LTE_Active", R2-061002, 3GPP TSG-RAN WG2 #52; Mar. 27-31, 2006, Athens, Greece. XP-050130928.

(Continued)

*Primary Examiner* — Gary Mui
*Assistant Examiner* — Richard K Chang
(74) *Attorney, Agent, or Firm* — McKenna Long & Aldridge LLP

(57) ABSTRACT

Disclosed is a radio (wireless) communication system providing a radio communication service and the terminal, and more particularly, to the method for receiving a MBMS service effectively by considering of time information related to a MBMS service transmission scheme.

5 Claims, 3 Drawing Sheets

U.S. PATENT DOCUMENTS

| | | |
|---|---|---|
| 7,313,116 B2 | 12/2007 | Lee et al. |
| 7,400,593 B2 | 7/2008 | Choi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergström et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 2002/0001314 A1 | 1/2002 | Yi et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0099305 A1 | 5/2003 | Yi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0148396 A1 | 7/2004 | Meyer et al. |
| 2004/0153852 A1 | 8/2004 | Wu |
| 2004/0184438 A1* | 9/2004 | Terry ............................ 370/349 |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0083943 A1 | 4/2005 | Lee et al. |
| 2005/0096017 A1 | 5/2005 | Kim |
| 2005/0100048 A1 | 5/2005 | Chun et al. |
| 2005/0118992 A1 | 6/2005 | Jeong |
| 2005/0147040 A1 | 7/2005 | Vayanos et al. |
| 2005/0164683 A1 | 7/2005 | Roberts et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0237932 A1 | 10/2005 | Liu |
| 2005/0238051 A1 | 10/2005 | Yi et al. |
| 2005/0254467 A1 | 11/2005 | Li et al. |
| 2005/0259662 A1 | 11/2005 | Kim |
| 2005/0286483 A1 | 12/2005 | Lee et al. |
| 2006/0007886 A1 | 1/2006 | Lee et al. |
| 2006/0056441 A1 | 3/2006 | Jiang |
| 2006/0067238 A1 | 3/2006 | Olsson et al. |
| 2006/0072503 A1 | 4/2006 | Kim et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth |
| 2006/0182065 A1 | 8/2006 | Petrovic et al. |
| 2006/0203780 A1 | 9/2006 | Terry |
| 2006/0233200 A1 | 10/2006 | Fifield |
| 2006/0251027 A1 | 11/2006 | Chun |
| 2006/0251105 A1 | 11/2006 | Kim et al. |
| 2006/0264179 A1 | 11/2006 | Bonneville et al. |
| 2006/0274690 A1 | 12/2006 | Chun et al. |
| 2006/0280145 A1 | 12/2006 | Revel |
| 2007/0047493 A1 | 3/2007 | Park et al. |
| 2007/0053309 A1 | 3/2007 | Poojary et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0183358 A1 | 8/2007 | Cai |
| 2007/0189205 A1 | 8/2007 | Terry et al. |
| 2007/0201397 A1 | 8/2007 | Zhang |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0051098 A1 | 2/2008 | Rao |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0165717 A1 | 7/2008 | Chen et al. |
| 2008/0182609 A1 | 7/2008 | Somasundaram et al. |
| 2008/0186944 A1 | 8/2008 | Suzuki et al. |
| 2008/0198869 A1 | 8/2008 | Jiang |
| 2008/0212561 A1 | 9/2008 | Pani et al. |
| 2008/0233941 A1 | 9/2008 | Jen |
| 2008/0268878 A1* | 10/2008 | Wang et al. .................. 455/458 |
| 2008/0273482 A1 | 11/2008 | Lee et al. |
| 2008/0310395 A1 | 12/2008 | Kashima |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0046631 A1 | 2/2009 | Meylan et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0175163 A1 | 7/2009 | Sammour et al. |
| 2009/0175253 A1 | 7/2009 | Wu et al. |
| 2009/0259908 A1 | 10/2009 | Gollapudi |
| 2010/0128648 A1 | 5/2010 | Lee et al. |
| 2010/0232335 A1 | 9/2010 | Lee et al. |
| 2011/0019604 A1 | 1/2011 | Chun et al. |
| 2011/0033048 A1 | 2/2011 | Stanwood et al. |
| 2011/0149865 A1 | 6/2011 | Lee et al. |

FOREIGN PATENT DOCUMENTS

| | | |
|---|---|---|
| EP | 1326397 | 7/2003 |
| EP | 1 509 011 A2 | 2/2005 |
| EP | 1695462 A1 | 8/2006 |
| EP | 1768297 | 3/2007 |
| EP | 2026523 | 2/2009 |
| EP | 2108223 | 10/2009 |
| JP | 07-162948 | 6/1995 |
| JP | 2001-197021 | 7/2001 |
| JP | 2002-198895 | 7/2002 |
| JP | 2003-115876 | 4/2003 |
| JP | 2003-516021 | 5/2003 |
| JP | 2003-229925 A | 8/2003 |
| JP | 2005-073276 | 3/2005 |
| JP | 2006-505209 A | 2/2006 |
| JP | 2006-121562 A | 5/2006 |
| JP | 2006-311543 A | 11/2006 |
| JP | 2007-116639 | 5/2007 |
| JP | 2007-312244 | 11/2007 |
| JP | 2008-520125 A | 6/2008 |
| JP | 2009-513058 A | 3/2009 |
| JP | 2009-521893 A | 6/2009 |
| KP | 10-2003-0087914 | 11/2003 |
| KR | 10-2004-0072961 A | 8/2004 |
| KR | 10-2005-0081836 A | 8/2005 |
| KR | 10-2005-0099472 A | 10/2005 |
| KR | 10-2005-0103127 A | 10/2005 |
| KR | 10-2006-00493 5 | 1/2006 |
| KR | 10-2006-0014910 A | 2/2006 |
| KR | 10-2006-0029452 A | 4/2006 |
| KR | 10-2007-0076374 | 7/2007 |
| RU | 2291594 | 1/2007 |
| RU | 2291594 C2 | 1/2007 |
| RU | 2304348 | 8/2007 |
| TW | 496058 | 7/2002 |
| WO | WO 01/37473 | 5/2001 |
| WO | WO 2004/042953 | 5/2004 |
| WO | WO 2004/042963 A1 | 5/2004 |
| WO | WO 2005/078967 A1 | 8/2005 |
| WO | WO 2005/122441 | 12/2005 |
| WO | WO 2006/009714 | 1/2006 |
| WO | WO 2006/016785 A1 | 2/2006 |
| WO | WO 2006/033521 A1 | 3/2006 |
| WO | WO 2006/083149 | 8/2006 |
| WO | WO 2006/095385 | 9/2006 |
| WO | WO 2006/104335 A2 | 10/2006 |
| WO | WO 2006/104342 A2 | 10/2006 |
| WO | WO 2006/118418 | 11/2006 |
| WO | WO 2006/118435 | 11/2006 |
| WO | WO 2007/020070 | 2/2007 |
| WO | WO 2007/023364 | 3/2007 |

| WO | WO 2007/045505 A1 | 4/2007 |
| WO | WO 2007/052921 A1 | 5/2007 |
| WO | WO 2007/078155 A2 | 7/2007 |
| WO | WO 2007/078164 A1 | 7/2007 |
| WO | WO 2007/078174 | 7/2007 |
| WO | WO 2007/079085 A2 | 7/2007 |
| WO | WO 2007/091831 | 8/2007 |
| WO | WO 2007/147431 | 12/2007 |
| WO | WO 2008/004725 | 1/2008 |
| WO | WO 2008/010063 | 1/2008 |
| WO | WO 2008/094120 | 8/2008 |
| WO | WO 2009/035301 | 3/2009 |

OTHER PUBLICATIONS

Texas Instruments: "UL Synchronization Management and Maintenance in E-UTRA", R1-072198, 3GPP TSG-RAN WG1 #49, May 7-11, 2007 Kobe, Japan. XP050105936.

Texas Instruments: "UL Synchronization Management in LTE_Active", R1-071478, 3GPP TSG RAN WG1 #48 bis, Mar. 26-30, 2007, St. Julians, Malta. XP050105413.

Motorola: "Contention-free Intra-LTE Handover", R2-070730, 3GPP TSG-RAN WG2 #57, Feb. 12-16, 2007, St. Louis, Missouri. XP 050133763.

Ericsson: "Scheduling Request in E-Utran", R1-070471, 3GPP TSG-RAN WG2 #47bis, Jan. 15-19, 2007, Sorrento, Italy. XP50104502.

Kashima, Method and Apparatus for Providing Timing Alignment, U.S. Appl. No. 60/944,662 (provisional applications are not published).

Wu et al. Enhanced Random Access Response Formats in E-UTRAN, U.S. Appl. No. 61/0069,348 (provisional applications are not published).

Nokia, "Uplink Scheduling for VoIP", 3GPP TSG-RAN WG2 Meeting #57, Feb. 12-16, 2007, St. Louis, Missouri. R2-070476, XP008125208.

Nokia, "Buffer Reporting for E-UTRAN", 3GPP TSG-RAN WG2 Meeting #52, Mar. 27-31, 2006, Athens, Greece. R2-060829, XP002503218.

Ericsson, Nokia Corporation, Nokia Siemens Networks, Qualcomm Europe, Samsung, NTT DoCoMo, Inc, "Framework for scheduling request and buffer status reporting", Nov. 5-9, 2007, TSG-RAN WG2 Meeting #60, R2-074691.

Motorola, "Synchronized Random Access Channel and Scheduling Request", Nov. 6-10, 2006, 3GPP TSG RAN1 #47, R1-063046.

Ericsson, "Basic principles for the scheduling request in LTE", Aug. 28-Sep. 1, 2006, 3GPP TSG RAN WG2 #54, R2-062350.

NTT DoCoMo, Fujitsu, Mitsubishi Electric, NEC, Sharp, Toshiba Corporation, "Scheduling Request Transmission Method for E-Utra Uplink" Nov. 6-10, 2006, 3GPP TSG RAN WG1 Meeting #47, R1-063301.

LG Electronics Inc. "Correction of status report coding", 3GPP TSG RAN WG2 #61, Feb. 11-15, 2008, Sorrento, Italy, XP-002624626, R2-080969.

$3^{rd}$ Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.

Alcatel-Lucent: "PDCP status report carrying LIS only", 3GPP TSG RAN WG2 #61, Jan. 14-18, 2008, Sevilla, Spain, XP-50138711, R2-080902.

Qualcomm Europe: "Further Details on RACH Procedure", 3GPP TSG-RAN WG1 #48, Feb. 12-16, 2007, St. Louis, Missouri, R1-070649.

NTT DoCoMo, Inc. "Buffer Status Report and Scheduling Request triggers", 3GPP TSG RAN WG2 #59, Aug. 20-24, 2007, Athens, Greece, R2-073574.

"Correction to PDCP Status Report", 3GPP TSG RAN WG2 #61 bis, Mar. 24, 2008, R2-081594, XP-002624627.

Ericsson: "Scheduling Request in E-UTRAN", 3GPP TSG-RAN WG2 #47bis, Sorrento, Italy, Jan. 15-19, 2007, R1-070471.

U.S. Appl. No. 60/976,139 (U.S. Appl. No. 12/238,810, filed Sep. 26, 2008 claims priority to this Provisional).

U.S. Appl. No. 61/019,058 (U.S. Appl. No. 12/340,033, filed Dec. 19, 2008 claims priority to this Provisional).

"Digital Cellular telecommunications system (Phase 2+); Functional stage 2 description of Location Serices (LCS) in GERAN (3GPP TS 43.059 version 7.3.0 Release 7); ETSI TS 143 059" ETSI Standards, LIS, Sophia Antipolis Cedex, France, vol. 3-G1, No. V7.3.0, XP014038519.

ZTE: "Redundant retransmission restraint in RLC-AM", 3GPP Draft; R2-061234, 3rd Generation Partnership Project, Mobile Competence Centre; vol. RAN WG2 no. Shanghai, China, May 3, 2006, XP050131180.

3GPP Ts 36.322, V8.0.0, Dec. 2007, $3^{rd}$ Generation Partnership Project; Technical Specification Group Radio Access Network; Evolved Universal Terrestrial Radio Access (E-UTRA) Radio Link Control (RLC) protocol specification (Release 8).

Change Request, Miscellaneous corrections to TS 36.322, 3GPP TSG-RAN2 Meeting #61, Shenzhen, China, Mar. 31-Apr. 4, 2008, R2-081700.

Ericsson: "Clarification to the handling of large RLC status reports", Change Request, 3GPP TSG-RAN2 Meeting #61bis, Shenzhen, China, Mar. 31-Apr. 4, 2008, R2-082018.

LG Electronics et al. "ACK_SN setting for short Status PDU", 3GPP TG-RAN WG2 #62, May 5-9, 2008, Kansas City, Missouri, R2-082133.

LG Electronics Inc., "UE state transition in LTE_ACTIVE", Agenda item: 6.1, Document for: Discussion, Decision, 3GPP TSG-RAN WG2 #52, Mar. 27-31, 2006, Athens, Greece, R2-061002.

Texas Instruments, "UL Synchronization Management and Maintenance in E-UTRA", Agenda Item: 7.8, Document for: Discussion, decision, 3GPP TSG RAN WG1 #49, Kobe, japan, May 7-11, 2007, R1-072198.

Texas Instruments, "UL Synchronization Management in LTE_ACTIVE", Agenda Item: 7.7, Document for: Discussion, decision, 3GPP TSG RAN WG1 #48bis, St. Julians, Malta, Mar. 26-30, 2007, R1-071478.

Reuven Cohen: "An improved SSCOP-like Scheme for Avoiding Unnecessary Retransmissions and Achieving Ideal Throughput", Proceedings of IEEE Infocom 1996, Conference on Computer Communications, Fifteenth Annual Joint Conference of the IEEE Computer and communications Societies, Mar. 24-28, 1996, pp. 855-862, XP010158150.

Agenda item: 7.4, Source: QUALCOMM Europe, Title: Scheduling request mechanism, Document for: Discussion and Decision, 3GPP TSG-RAN WG1 #48bis, Mar. $26^{th}$-$30^{th}$, 2007, St. Julian, Malta, R1-071276.

Source: Texas Instruments, Title: Scheduling Request and DRX in E-Utra, Agenda Item: 7.13.2, Document for: Discussion, decision, 3GPP TSG RAN WG1 #49bis, Orlando, USA, Jun. 25-29, 2007, R1-072859.

Change Request, CR-Form-v9.3, 36.300 CR 0004, rev 1, Current version: 8.1.0, 3GPP TSG-RAN2 Meeting #59, Athens, Greece, Jun. 20-24, 2007, R2-073863.

Agenda Item: 5.2.2, Source: Ericsson, Title: SDU Discard, Document for: Discussion, decision, 3GPP TSG-RAN WG2 #59, Athens, Greece, Aug. 20-21, 2007, R2-073230.

Agenda Item: 5.1.1.2, Source: Motorola, Title: MAC Header format, Document for: Discussion/Decision, 3GPP TSG-RAN2 Meeting #59bis, Shanghai, P.R. China, Oct. $8^{th}$-$12^{12}$, 2007, R2074419.

Agenda Item: 5.1.1.2, Source: NTT DoCoMo, Inc., NEC, Title: MAC PDU structure for LTE, Document for: Discussion and Decision, 3GPP TSG RAN WG2 #59bis, Oct. $8^{th}$-$12^{12}$, 2007, Shanghai, China, R2-074174.

3GPP TS 36.321 V1.0.0 (Sep. 2007), Technical Specification, "$3^{rd}$ Generation Partnership Project; Technical Specification Group radio Access Network; Evolved Universal Terrestrial Radio Access (E-UTRA) Medium Access Control (MAC) protocol specification (Release 8)".

Source: Chairman, Date: Oct. $12^{th}$, Object: LTE User Plane session report, 3GPP TSG RAN WG2 #59bis, Oct. $8^{th}$-$12^{12}$, 2008, Shanghai, China, R2-074536.

3GPP TS 25.321 V7.5.0 (Jun. 2007), Technical Specification, "$3^{rd}$ Generation Partnership Project; Technical Specification Group Radio Access Network; Medium Access Control (MAC) protocol specification (Release 7)".

Itri, "Buffer Status Reporting with Group Combining for LTE", 3GPP TSG RAN WG2, meeting #58bis, Orlando, Florida, Jun. 25-29, 2007, R2-072833.

NEC, "Consideration on Scheduling Information", 3GPP TSG RAN WG2 #59, Athens, Greece, Aug. 20-24, 2007, R2-073556.

ASUSTeK, "On-line recovery of HFN synchronization due to RLC UM SN problem", 3GPP TSG-RAN WG2 meeting #44, Sophia-Antipolis, France, Oct. 4-8, 2004, R2-041940.

Rapporteur (ASUSTeK), "Summary of HFN de-synchronization problem off-line email discussion", 3GPP TSG RAN WG2 #46, Scottsdale, Arizona, Feb. 14-18, 2005, R2050318.

Amitava Ghosh et al., "Random Access Design for UMTS Air-Interface Evolution", Networks and Enterprise Business, Motorola, 2007 IEEE, pp. 1041-1045.

* cited by examiner

[Fig. 1]
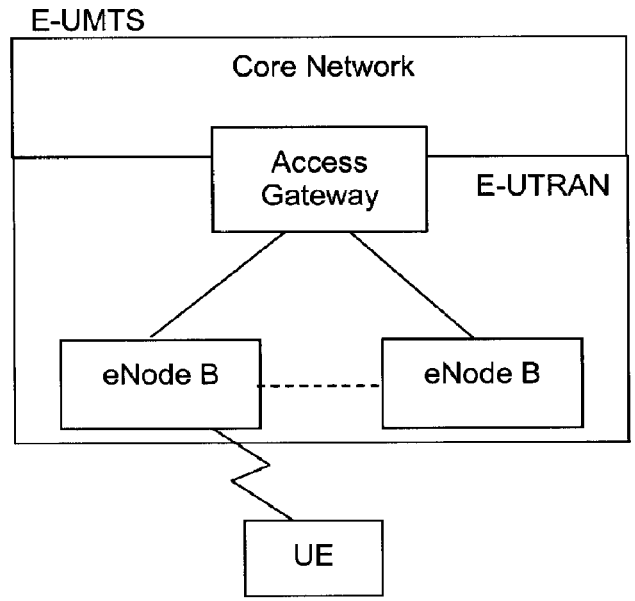
[Fig. 2]
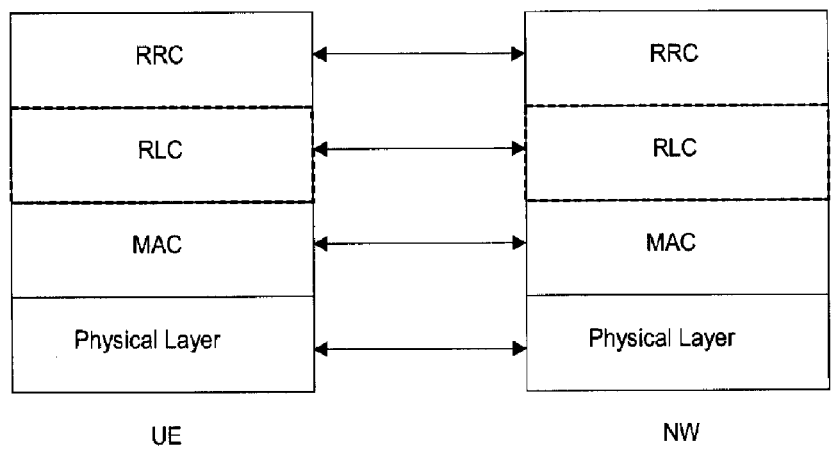
[Fig. 3]
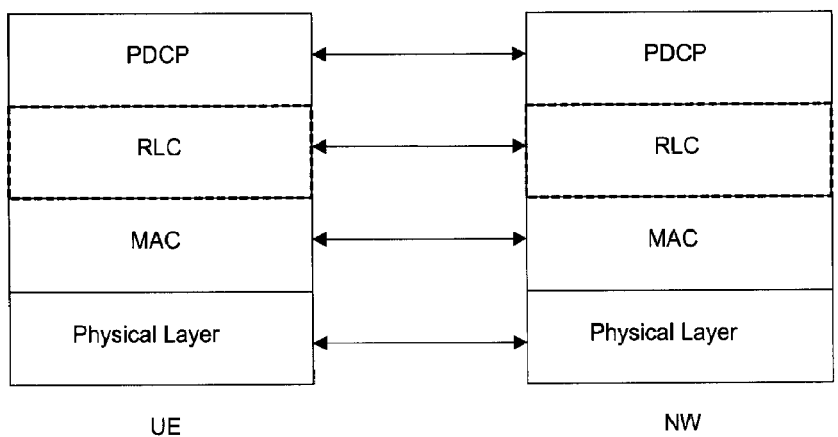

[Fig. 4]
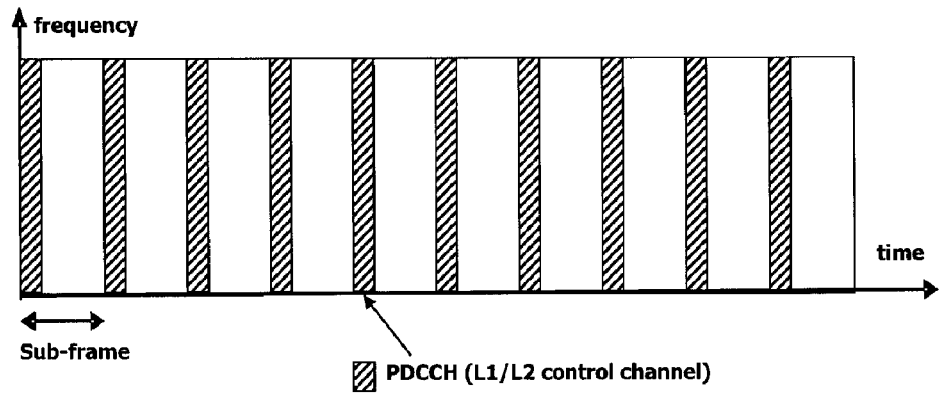
[Fig. 5]
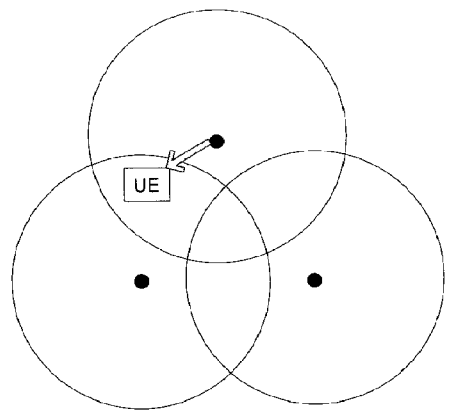
[Fig. 6]
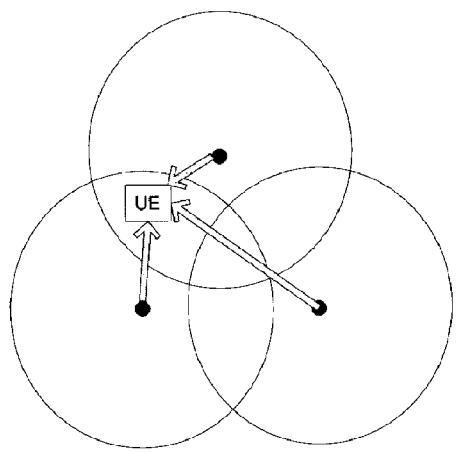

[Fig. 7]
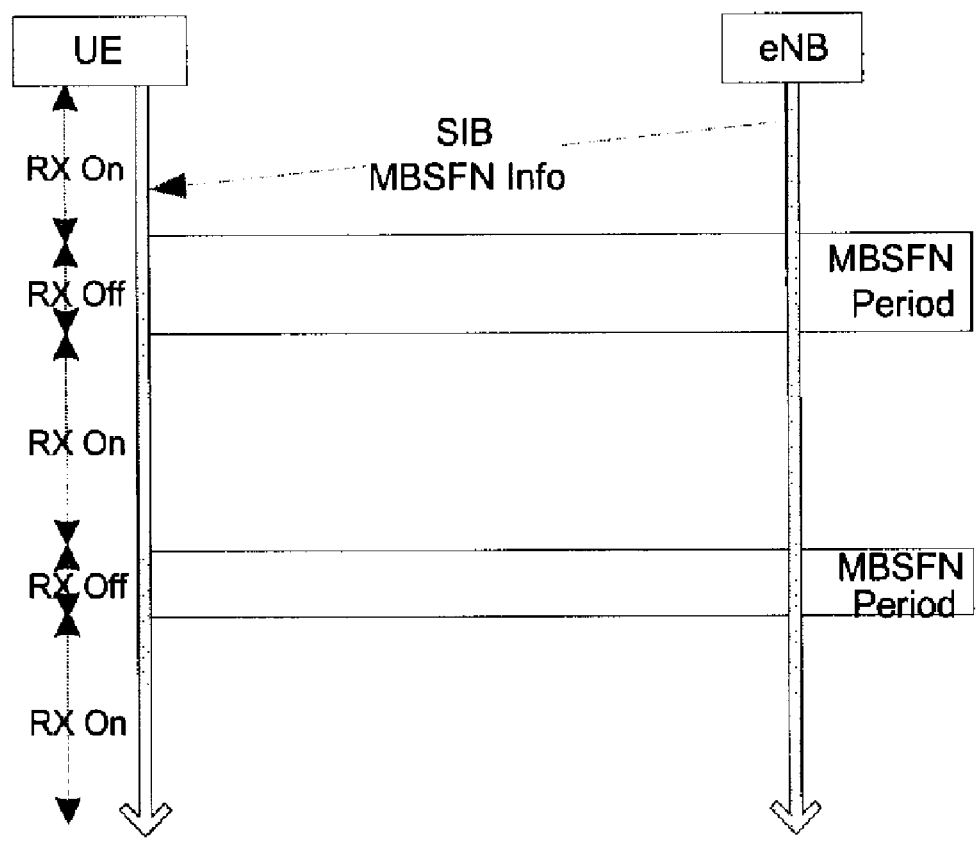

EFFECTIVE RECEPTION METHOD IN WIRELESS COMMUNICATION SYSTEM PROVIDING MBMS SERVICE

This application is a National Stage Entry of International Application No. PCT/KR2008/004640, filed on Aug. 8, 2008, and claims priority to Korean Patent Application No. 10-2008-0077562, filed Aug. 7, 2008 and U.S. Provisional Application No. 60/955,040, filed Aug. 10, 2007, each of which is hereby incorporated by reference in its entirety as if fully set forth herein.

TECHNICAL FIELD

The present invention relates to a radio (wireless) communication system providing a radio communication service and a terminal, and more particularly, to a method for receiving a MBMS service effectively by considering of time information related to a MBMS service transmission scheme.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

FIG. 2 shows an exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

The user plane (U-plane) denotes a path for transmitting data generated in the application layer, e.g., voice data, Internet Packet data, and the like. The control plane (C-plane) denotes a path for transmitting control messages used by the terminal and the network for a call management.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a healer compression function that reduces unnecessary control information such that data being transmitted by employing Internet Protocol (IP) packets, such as IPv4 or IPv6 can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a Broadcast Channel (BCH) used for transmitting system information, and a downlink Shared Channel (SCH) used for transmitting user traffic or control messages. A downlink multicast, traffic of broadcast service or control messages may be transmitted via the downlink SCH or via a separate downlink Multicast Channel (MCH). As for channels used in uplink transmission for transmitting data from the mobile terminal to the network, there is a Random Access Channel (RACH) used for transmitting an initial control message, and an uplink Shared Channel (SCH) used for transmitting user traffic or control messages.

Logical channels located above the transport channel and mapped onto the transport channel may include a Broadcast channel (BCCH), a Paging Control Channel (PCCH), a Common Control Channel (CCCH), a Multicast Control Channel (MCCH), a Multicast Traffic Channel (MTCH), and the like.

The physical channel is comprised of a plurality of sub-frames on a time axis and a plurality of sub-carriers on a frequency axis. Here, one sub-frame is comprised of a plurality of symbols on the time axis. One sub-frame is comprised of a plurality of resource blocks (RBs), and a resource block is comprised of a plurality of symbols and a plurality of sub-carriers. In addition, each sub-frame may use specific sub-carriers of specific symbols (e.g., a first symbol) of a corresponding sub-frame for the Physical Downlink Control Channel (PDCCH), that is, the L1/L2 control channel. One sub-frame has a time duration (or period) of 05 ms, and a Transmission Time Interval (TTI) indicating a unit of time that data is transmitted has a time duration of 1 ms, corresponding to 2 sub-frames.

As described above, the E-UTRAN is comprised of two parts: one is the base station and the other the terminal. Radio resources in one cell are comprised of uplink radio resources and downlink radio resources. The base station is configured to handle an allocation and a control of the uplink radio resources and the downlink radio resources of the cell. That is, the base station may determine when and which terminal uses which radio resources. For instance, the base station may determine to allocate a frequency in the range of 100 MHz and 101 MHz for a downlink data transmission in 3.2 seconds to a user 1 for 0.2 seconds. Then, the base station may inform this to the corresponding terminal such that the terminal may receive the downlink data. Similarly, the base station may determine when and which terminal uses which amount of radio resources for an uplink data transmission. Then, the base station may inform this to the corresponding terminal such that the terminal may perform the data transmission for the certain period of time. Contrary to the related art, dynamic management of the radio resources by the base station can be effective. The related art terminal is allowed to continue to use a radio resource as long as a call is connected. However, this would be unreasonable in consideration of a recent trend in which various services are based on the IP packet. This is because most of the packet services do not continuously generate a packet while the call is connected, resulting in many periods for not transmitting any data or packets. In this case, it would be very inefficient to continue to allocate radio resources to one terminal. In order to solve this problem, the E-UTRAN system has adopted the above-described allocation method for radio resources only if it is needed by the terminal and only when any service data is available.

Hereinafter, description of an RRC state of a terminal and a RRC connection method will be given in detail. The RRC state refers to whether the RRC of the terminal is logically connected to the RRC of the E-UTRAN, thereby forming a logical connection with the RRC of the E-UTRAN. If the RRC of the terminal forms a logical connection with the RRC of the E-UTRAN, this is referred to as an "RRC connected state." Conversely, if there is no logical connection between the RRC of the terminal and the RRC of the E-UTRAN, this is referred to as an "RRC idle state." When the terminal is in the RRC connected state and, accordingly, the E-UTRAN can recognize the existence of the corresponding terminal according to units of cells, the E-UTRAN can effectively control the terminal. On the other hand, the E-UTRAN cannot recognize a terminal that is in idle state. The terminal in idle state can be managed by the CN according to units of location areas or units of tracking areas, which are areas larger than the cell. Specifically, the existence of a terminal in idle state is only recognized according to units of large areas, such as location areas or tracking areas, and the terminal must transition into the connected state in order to receive typical mobile communication services such as voice or data.

When a user initially turns on the power of the terminal, the terminal first detects an appropriate cell and maintains its idle state in the corresponding cell. The terminal in idle state forms an RRC connection with the RRC of the E-UTRAN through the RRC connection procedure and transitions into the RRC connected state when the RRC connection needs to be formed. There are several instances in which a terminal in idle state is required to form the RRC connection. For example, an uplink data transmission may be required due to a call attempt by a user or the transmission of a response message in response to a paging message received from the E-UTRAN may be required.

Hereinafter, description of system information will be given. The system information may include all required information that a terminal should know for a connection with a base station. Accordingly, before the terminal attempts to connect to the base station, it should receive all system information and always have the most updated system information. In addition, considering that all terminals within one cell should know the system information, the base station periodically transmits the system information.

The system information may be divided into a Master Information Block (MIB), a Scheduling Block (SB), a System Information Block (SIB), and the like. The MIB serves to inform the terminal about a physical construction of a corresponding cell (e.g., a bandwidth, and the like). The SB serves to inform the terminal about transmission information of SIBs (e.g., a transmission period and the like). The SIB refers to a collection (aggregate) of system information that is related to each other. For instance, some SIBs may include information of neighboring cells only, and other SIBs may include information about an uplink radio channel only used by the terminal.

DISCLOSURE OF INVENTION

Technical Solution

In the related art, if a certain terminal is to provide an MBMS capability, the terminal should support a variety of MBMS transmission schemes in which the base station may use for transmission. For instance, if the cell provides the MBMS service, the terminal supporting the MBMS service should be able to receive the MBMS service regardless of the cells in which the terminal is camping on. Here, each cell would provide an MBMS service via an optimized transmission based on their conditions. Thusly, each terminal should support a variety of MBMS service transmission schemes. However, if the terminal that does not support the MBMS service receives a frame using the MBMS service scheme, the terminal would receive incorrect information, thereby causing the call to be disconnected.

Therefore, an object of the present invention is to provide a method for effectively informing, by a network or a base station, terminals about information of each frame transmitted from a cell in a radio communication system providing an MBMS service.

To achieve this and other advantages and in accordance with the purpose of the present invention, as embodied and broadly described herein, there is provided a method of receiving a point-to-multipoint service in wireless communication system, the method including: receiving time information related to a multi-cell transmission scheme for the point-to-multipoint service; and performing a next operation according to the received time information.

To achieve this and other advantages and in accordance with the purpose of the present invention, as embodied and broadly described herein, there is also provided a method of receiving a point-to-multipoint service in wireless communication system, the method comprising: receiving time information related to a multi-cell transmission scheme for the point-to-multipoint service; and performing a measurement process or a monitoring of a downlink channel with consideration of the received time information.

To achieve this and other advantages and in accordance with the purpose of the present invention, as embodied and broadly described herein, there is also provided a mobile terminal for receiving a point-to-multipoint service in a wireless communications system, the mobile terminal comprising: a transceiver adapted to transmit or receive the point-to-multipoint service; a memory adapted to store the transmitted or received point-to-multipoint service via the transceiver or from an external source; and a processor cooperating with the transceiver and the memory and adapted to perform the steps of, receiving time information related to a multi-cell transmission scheme for the point-to-multipoint service; and performing a measurement process or a monitoring of a downlink channel with consideration of the received time information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows an exemplary network structure of an Evolved Universal Mobile Telecommunications System (E-UMTS) as a mobile communication system to which a related art and the present invention are applied;

FIG. 2 shows an exemplary view of related art control plane architecture of a radio interface protocol between a terminal and an E-UTRAN;

FIG. 3 shows an exemplary view of related art user plane architecture of a radio interface protocol between a terminal and an E-UTRAN;

FIG. 4 shows an exemplary view of a related art physical channel structure for control channel transmission;

FIG. 5 shows an exemplary MBMS service data transmission using a single-cell transmission scheme;

FIG. 6 shows an exemplary MBMS service data transmission using a multi-cell transmission scheme; and FIG. 7 shows an exemplary reception operation of a terminal according to the present invention.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, the wireless network may provide the MBMS Control Channel (MCCH) and the MBMS Traffic Channel (MTCH) for an MBMS service. The MCCH is used for transmitting MBMS control information to a terminal. The MTCH is used for transmitting the MBMS service to the terminal. The MBMS service is comprised of one session or a plurality of sessions, and only one session should exist for single time period (or duration). The wireless network may transmit an MBMS notification message in order to inform a session start of the MBMS service or a change of the MBMS control information. The notification message may be transmitted via the MCCH channel. Meanwhile, through the MBMS Indicator Channel (MICH), the wireless network notifies the terminal whether or not a MBMS notification message or control information for a specific service has been changed (modified).

The MBMS service may be divided into a multi-cell service which is provided a service of the same contents from a plurality of cells, and a single-cell service which is provided from a single cell only.

FIG. 5 shows an exemplary MBMS service data transmission using a single-cell transmission scheme. Referring to FIG. 5, the terminal is configured to receive data only from a specific cell in which the terminal is camping on. In addition, the single-cell service is configured to be transmitted only in an area of the specific cell via the transport channel Downlink Shared Channel (DL SCH). That is, it indicates the MBMS service data transmission scheme using the DL SCH. Here, the single-cell service does not support the MBMS service transmission combination of a plurality of cells.

FIG. 6 shows an exemplary MBMS service data transmission using a multi-cell transmission scheme. Referring to FIG. 6, a terminal is configured to receive a signal or MBMS service data of the same content from a specific cell in which the terminal is camping on as well as from another cell, other than the specific cell. Here, the multi-cell service is transmitted via the transport channel Multicast Channel (MCH). That is, the MCCH and MTCH are mapped onto the MCH. In addition, if the terminal receives the multi-cell service via the MCH channel, the terminal may receive the multi-cell service by combining the same multi-cell services which are transmitted from multiple cells using an MBMS Single Frequency Network (MBSFN) scheme.

As described above, if a certain terminal is to provide an MBMS capability, the terminal should support a variety of MBMS transmission schemes in which the base station may use for transmission. For instance, if the cell provides an MBMS service, the terminal supporting the MBMS service should be able to receive the MBMS service regardless of the cells in which the terminal is camping on. Here, each cell would provide an MBMS service via an optimized transmission based on their conditions. Thusly, each terminal should support a variety of MBMS service transmission schemes.

However, the MCH which is transmitted in the MBSFN scheme and the DL-SCH which is not transmitted in the MBSFN scheme have a different physical architecture (construction). For instance, the number of symbols, a reference symbol, etc. which can be used during one frame duration may be different from each other. Accordingly, the terminal should acknowledge which specific frame is transmitted using the MBSFN scheme.

In particular, in the LTE system, all terminals do not always support the MBMS capability. Here, a terminal that does not support the MBMB service would not support the MBSFN scheme. In this case, if the terminal that does not support MBMS receives a frame using the MBSFN scheme, the terminal would receive incorrect information, thereby causing the call to be disconnected.

Accordingly, the present invention is to provide a method for effectively informing, by the base station, the terminals information about each frame transmitted from a cell. More specifically, the base station may inform the terminal about time information when data is to be transmitted via the MCH channel. In addition, the base station may inform the terminal about time information when the MCH channel is to be used. Further, the base station may inform the terminal about time information when the data is to be transmitted using the MBSFN scheme, or when the MBSFN scheme is to be used.

In addition, according to the present invention, the base station may inform the terminal about time information when terminals having a specific capability only may appropriately receive the data, or when terminals using a specific service only may appropriately receive the data. The base station may inform the terminal about time information when the terminal that does not have a certain capability is not required to receive data, or when the terminal that does not have a certain capability is not required to receive the downlink channel. Also, the base station may inform the terminal about time information when a terminal that does not use a specific service is not required to receive data, or when the terminal that does not use the specific service is not required to receive the downlink channel.

Here, if a certain terminal that does not have the specific capability receives the time information, the certain terminal does not receive the downlink channel for such time duration. In this case, the terminal does not receive the downlink channel, thereby not performing a measurement process for the cell which transmits the downlink channel. In addition, if a certain terminal that does not have the specific capability receives the time information, the certain terminal does not attempt to receive data during the time duration. That is, the terminal considers that the data is not transmitted to the terminal itself during the time duration indicated by the time information. Accordingly, the terminal considers that information indicating the data transmission would not be transmitted to the terminal itself during the time duration indicated by the time information, as well as allocation of radio resources would not be performed to the terminal. In this case, the terminal does not receive the downlink channel, thereby not performing the measurement process for the cell which transmits the downlink channel.

In the process described in the present invention, the time-related information may be transmitted via the Broadcast Channel (BCH) or the L1/L2 control channel, i.e., the Physical Downlink Control Channel (PDCCH). In addition, the time-related information may indicate Transmission Time Interval (TTI) information or frame information. Also, the specific capability of the terminal, as described above, may denote capabilities of receiving a channel transmitted in the MBSFN scheme, receiving a frame transmitted in the MBSFN scheme, receiving the MCH channel, receiving the frame in which the MCH channel is transmitted, or receiving the multi-cell service transmitted as the same signal through the plurality of cells. In the process described in the present invention, the specific service may denote the MBMS service, the service transmitted via the MCH channel, the service transmitted via the MBSFN scheme, or the service transmitted via the multi-cell transmission scheme.

FIG. 7 shows an exemplary reception operation of a terminal in a communication system providing the MBMS service according to the present invention.

First, it is assumed that the terminal as shown in the FIG. 7 does not support the MBMS service or does not receive, through the MBSFN, the MBMS service that it desires to receive. If the terminal receives the MBSFN information from the base station through the System Information Block (SIB), and then checks at which time duration the MBSFN is used, based on the received MBSFN information. Thereafter, the terminal neither receives the downlink channel in the period the MBSFN is used, nor performs the measurement process. However, in other time duration, in which other than the time duration in which the MBSFN is used, the terminal may receive the downlink channel or perform the measurement process if it is needed.

If the terminal supports the MBMS service or receives, through the MBSFN, the MBMS service that it desires to receive, the terminal would receive the MBSFN information from the base station through the SIB, and then checks at which time duration the MBSFN is used, based on the received MBSFN information. Thereafter, the terminal may receive a point-to-multipoint service or MBMS service by using the multi-cell transmission scheme in the period in which the MBSFN scheme is used.

Therefore, the present disclosure has an effect of reducing the power consumption of the terminal by effectively receiving, by the terminal, the downlink channel based on information about the time duration related to information of each frame transmitted to the cell from the base station, in particular, the MBMS service.

The present disclosure may provide a method of receiving a point-to-multipoint service in wireless communication system, the method comprising: receiving time information related to a multi-cell transmission scheme for the point-to-multipoint service; and performing a next operation according to the received time information, wherein the next operation is performed by determining whether the point-to-multipoint service is provided using the multi-cell transmission scheme, the point-to-multipoint service is received based on the time information if the point-to-multipoint service is provided using the multi-cell transmission scheme, the multi-cell transmission scheme is MBSFN (MBMS Single Frequency Network), the time information indicates a specific time when to perform the multi-cell transmission scheme, the time information is received via a SIB (System Information Block), the time information is received through a BCH (Broadcast Channel) or a PDCCH (Physical Downlink Control Channel), the time information is related to TTI (Transmission Time Interval) information or frame information, and the time information indicates at least one of a time pattern, a starting time, an ending time, or a time period that the multi-cell transmission scheme is performed.

It can be also said that the present disclosure may also provide a method of receiving a point-to-multipoint service in wireless communication system, the method comprising: receiving time information related to a multi-cell transmission scheme for the point-to-multipoint service; and performing a measurement process or a monitoring of a downlink channel with consideration of the received time information, wherein the measurement process or the monitoring of the downlink channel is not performed at a time indicated by the received time information if a capability of corresponding terminal does not satisfy a certain condition, the capability of corresponding terminal is determined by whether or not the corresponding terminal is capable to receive a transmitted channel or a transmitted frame in the multi-cell transmission scheme, the multi-cell transmission scheme is MBSFN (MBMS Single Frequency Network), and the point-to-multipoint service is a MBMS service.

The present disclosure may also provide a mobile terminal for receiving a point-to-multipoint service in a wireless communications system, the mobile terminal comprising: a transceiver adapted to transmit or receive the point-to-multipoint service; a memory adapted to store the transmitted or received point-to-multipoint service via the transceiver or from an external source; and a processor cooperating with the transceiver and the memory and adapted to perform the steps of, receiving time information related to a multi-cell transmission scheme for the point-to-multipoint service; and performing a measurement process or a monitoring of a downlink channel with consideration of the received time information.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be male to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of receiving a point-to-multipoint service in wireless communication system, the method comprising:
  receiving time information related to a multi-cell transmission scheme for the point-to-multipoint service;
  determining whether the point-to-multipoint service is provided using the multi-cell transmission scheme;
  if it is determined that the point-to-multipoint service is provided using the multi-cell transmission scheme, determining whether a reception of the point-to-multipoint service can be performed using the multi-cell transmission scheme;
  if it is determined that the reception of the point-to-multipoint service can be performed using the multi-cell transmission scheme, receiving the point-to-multipoint service via a downlink channel according to the received time information, wherein the time information indicates at least two of a time pattern, a starting time, an ending time, or a time period that the multi-cell transmission scheme should be performed; and
  if it is determined that the reception of the point-to-multipoint service can not be performed using the multi-cell transmission scheme, pausing to receive the point-to-multipoint service via the downlink channel according to the received time information, wherein the time information indicates at least two of a time pattern, a starting time, an ending time, or a time period that the reception of the point-to-multipoint service should be paused,
  wherein the point-to-multipoint service is a Multimedia Broadcast/Multicast Service (MBMS) service, and
  wherein the multi-cell transmission scheme is MBMS Single Frequency Network (MBSFN).

2. A mobile terminal for receiving a point-to-multipoint service in a wireless communications system, the mobile terminal comprising:
  a transceiver adapted to transmit or receive the point-to-multipoint service;
  a memory adapted to store the transmitted or received point-to-multipoint service via the transceiver or from an external source; and
  a processor cooperating with the transceiver and the memory and adapted to perform the steps of,
  receiving time information related to a multi-cell transmission scheme for the point-to-multipoint service;
  determining whether the point-to-multipoint service is provided using the multi-cell transmission scheme;
  if it is determined that the point-to-multipoint service is provided using the multi-cell transmission scheme, determining whether a reception of the point-to-multipoint service can be performed using the multi-cell transmission scheme;
  if it is determined that the reception of the point-to-multipoint service can be performed using the multi-cell transmission scheme, receiving the point-to-multipoint service via a downlink channel according to the received time information, wherein the time information indicates at least two of a time pattern, a starting time, an ending time, or a time period that the multi-cell transmission scheme should be performed; and
  if it is determined that the reception of the point-to-multipoint service can not be performed using the multi-cell transmission scheme, pausing to receive the point-to-multipoint service via the downlink channel according to the received time information, wherein the time information indicates at least two of a time pattern, a starting time, an ending time, or a time period that the reception of the point-to-multi point service should be paused
  wherein the point-to-multipoint service is a Multimedia Broadcast/Multicast Service (MBMS) service, and
  wherein the multi-cell transmission scheme is MBMS Single Frequency Network (MBSFN).

3. The method of claim 1, wherein the time information is received via a SIB (System Information Block).

4. The method of claim 1, wherein the time information is received through a BCH (Broadcast Channel) or a PDCCH (Physical Downlink Control Channel).

5. The method of claim 1, wherein the time information is related to TTI (Transmission Time Interval) information or frame information.

* * * * *